(No Model.)
T. F. FREEL.
DINNER PAIL.
No. 300,591. Patented June 17, 1884.
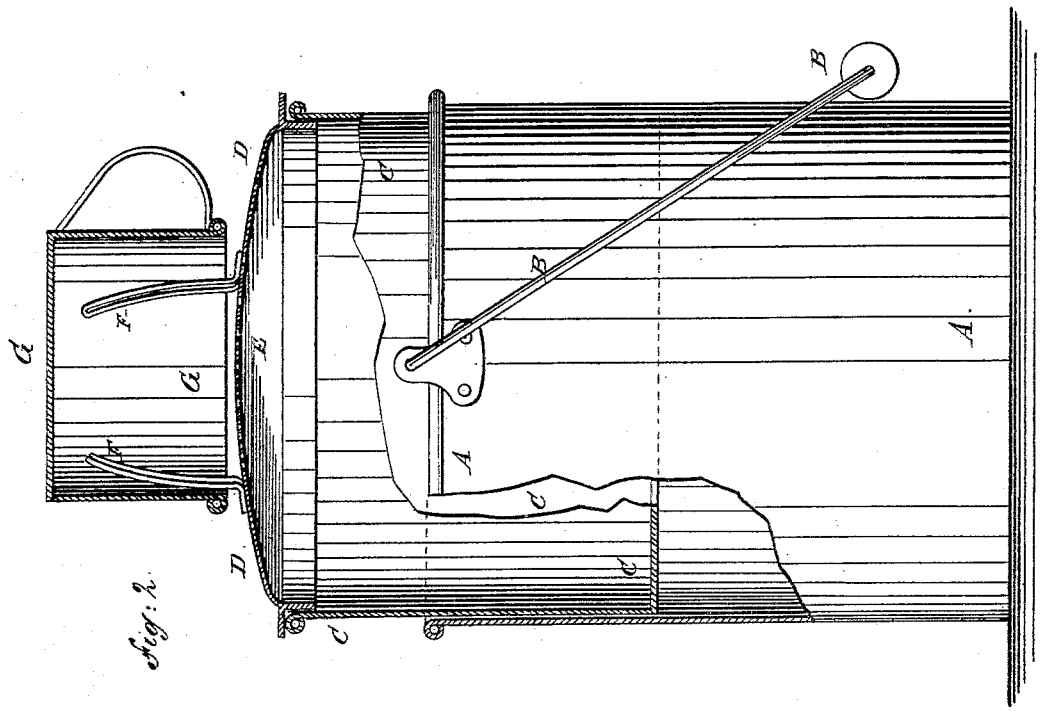
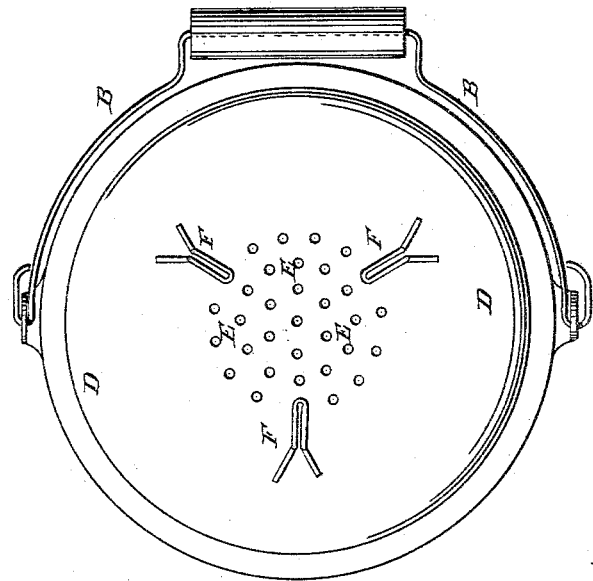
WITNESSES:
Chas. Nida.
C. Sedgwick
INVENTOR:
T. F. Freel
BY Munn & Co.
ATTORNEYS.

UNITED STATES PATENT OFFICE.

THOMAS F. FREEL, OF NEW YORK, N. Y.

DINNER-PAIL.

SPECIFICATION forming part of Letters Patent No. 300,591, dated June 17, 1884.

Application filed May 1, 1884. (No model.)

*To all whom it may concern:*

Be it known that I, THOMAS F. FREEL, of the city, county, and State of New York, have invented a new and useful Improvement in Dinner-Pails, of which the following is a full, clear, and exact description.

Reference is to be had to the accompanying drawings, forming a part of this specification, in which similar letters of reference indicate corresponding parts in both the figures.

Figure 1 is a plan view of one of my improved dinner-pails, the cup being removed. Fig. 2 is a side elevation of the same, partly in section.

The object of this invention is to ventilate the lunch-compartments of dinner-pails, and thus keep the food fresh.

The invention consists in a dinner-pail constructed with perforations in the middle part of its cover, to allow air to pass freely into and out of the lunch-receptacle to keep the food fresh, and with curved wires attached to the said cover around the said perforations, so that the cup can be carried without obstructing the passage of air through the said perforations.

A represents a pail, which is provided with a bail, B, and into its upper part is fitted the lunch-receptacle C, in the ordinary manner, a space being left in the lower part of the pail A to receive coffee or other liquid. The receptacle C projects above the pail A, and is provided with a cover, D, which has a number of small perforations, E, formed in its middle part, to allow air to pass into and out of the interior of the said receptacle to keep the food fresh.

To the cover D, around the perforations E, are soldered or otherwise secured the lower ends of three or more wires, F, which are curved outward and then inward. The wires F are placed at such a distance apart that their outer or convex sides will rest against the inner surface of the cup G, and thus support the said cup and hold it securely in place. The supporting-wires F are so formed as to prevent the edge of the cup G from coming in contact with the cover D, so that the cup G will not prevent the air from passing freely into and out of the receptacle C through the perforations E, while at the same time the said cup G serves as a cover to the perforated part of the cover D.

Having thus described my invention, I claim as new and desire to secure by Letters Patent—

1. A dinner-pail constructed, substantially as herein shown and described, with perforations in the middle part of its cover and with curved cup-supporting wires attached to the said cover, as set forth.

2. In a dinner-pail, the combination, with the lunch-receptacle C, of the cover D, having perforations E, substantially as herein shown and described, whereby air can pass into and out of the said receptacle to keep the food fresh, as set forth.

3. In a dinner-pail, the combination, with the lunch-receptacle cover D, having perforations E, of the curved wires F, substantially as herein shown and described, whereby the cup can be carried without obstructing the passage of air through the said perforations, as set forth.

THOMAS F. FREEL.

Witnesses:
JAMES T. GRAHAM,
C. SEDGWICK.